Nov. 25, 1958     R. E. RISLEY ET AL     2,861,822
LARGE DIAMETER TYPE PIPE COUPLING WITH
SEPARABLE PARKING FOLLOWER
Filed June 25, 1953     7 Sheets-Sheet 1
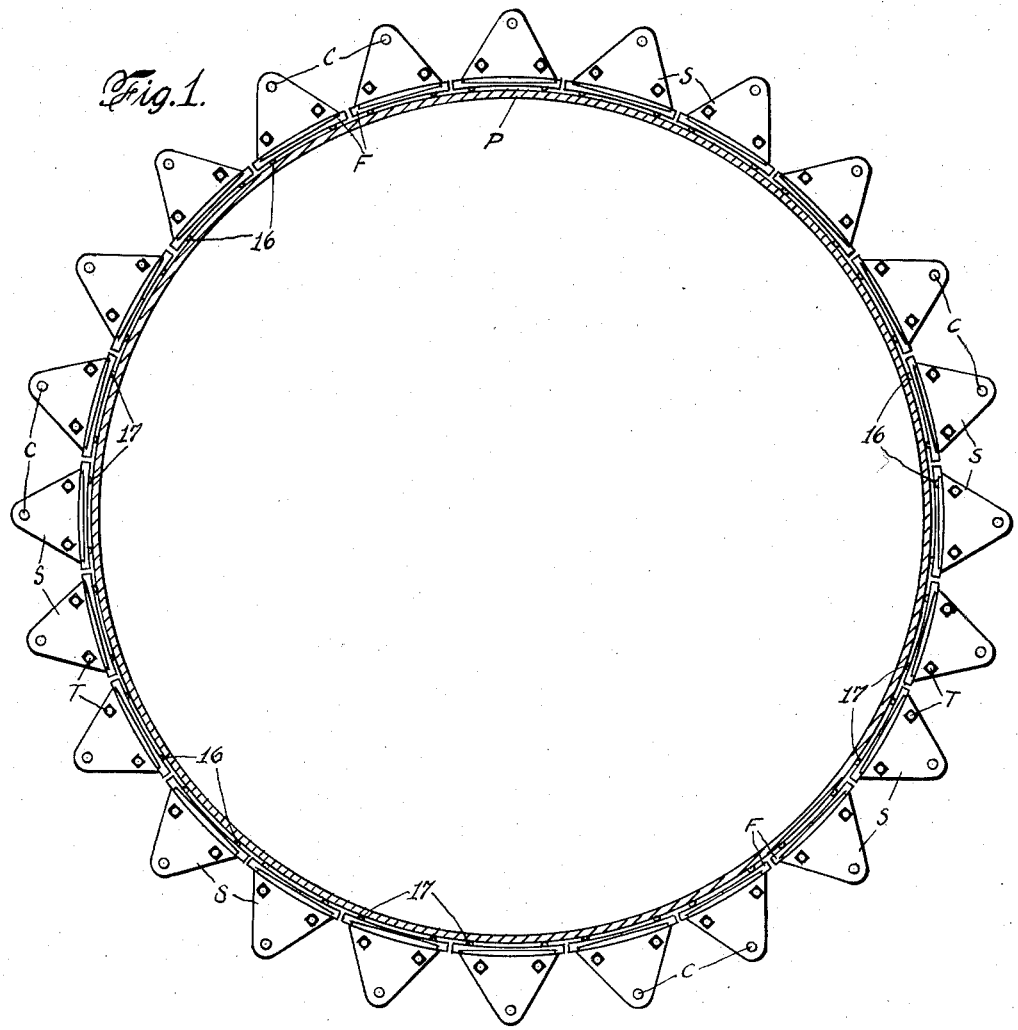
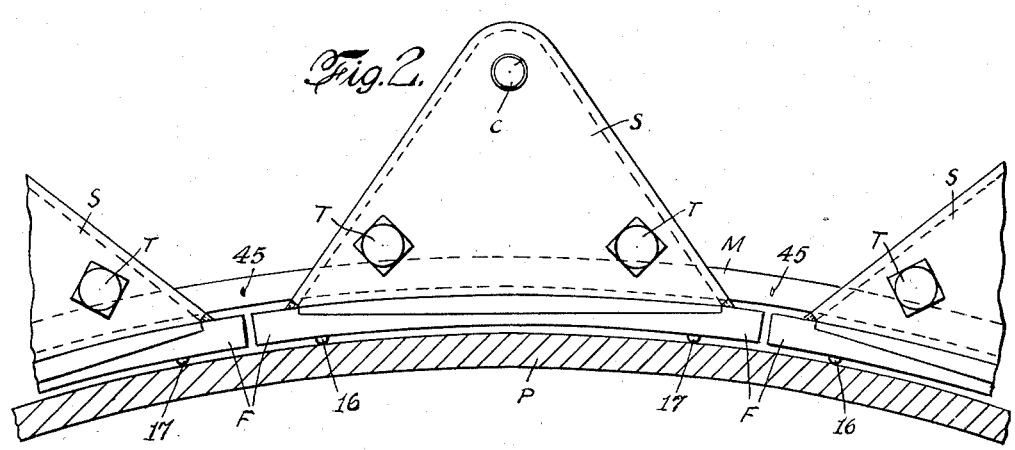

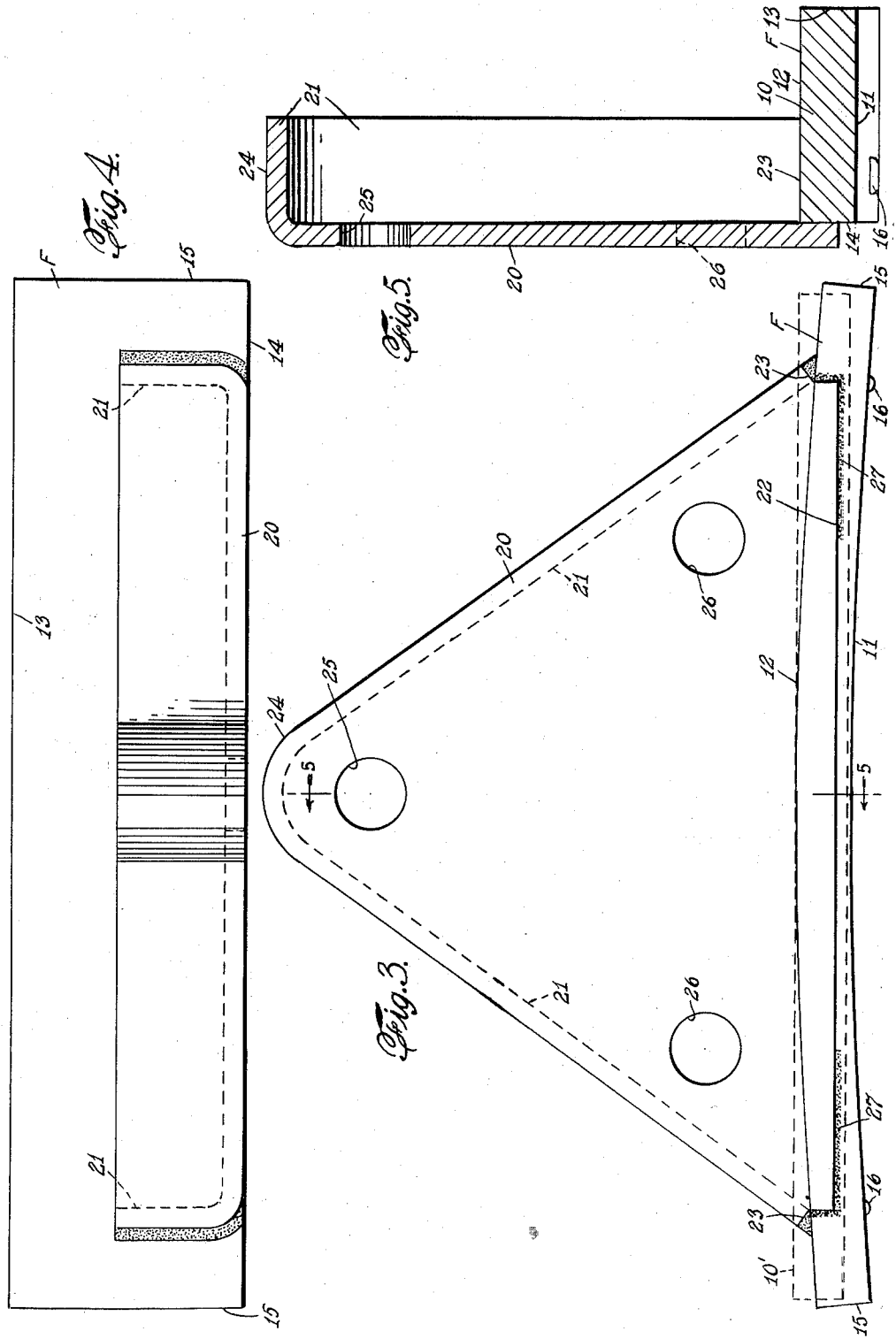

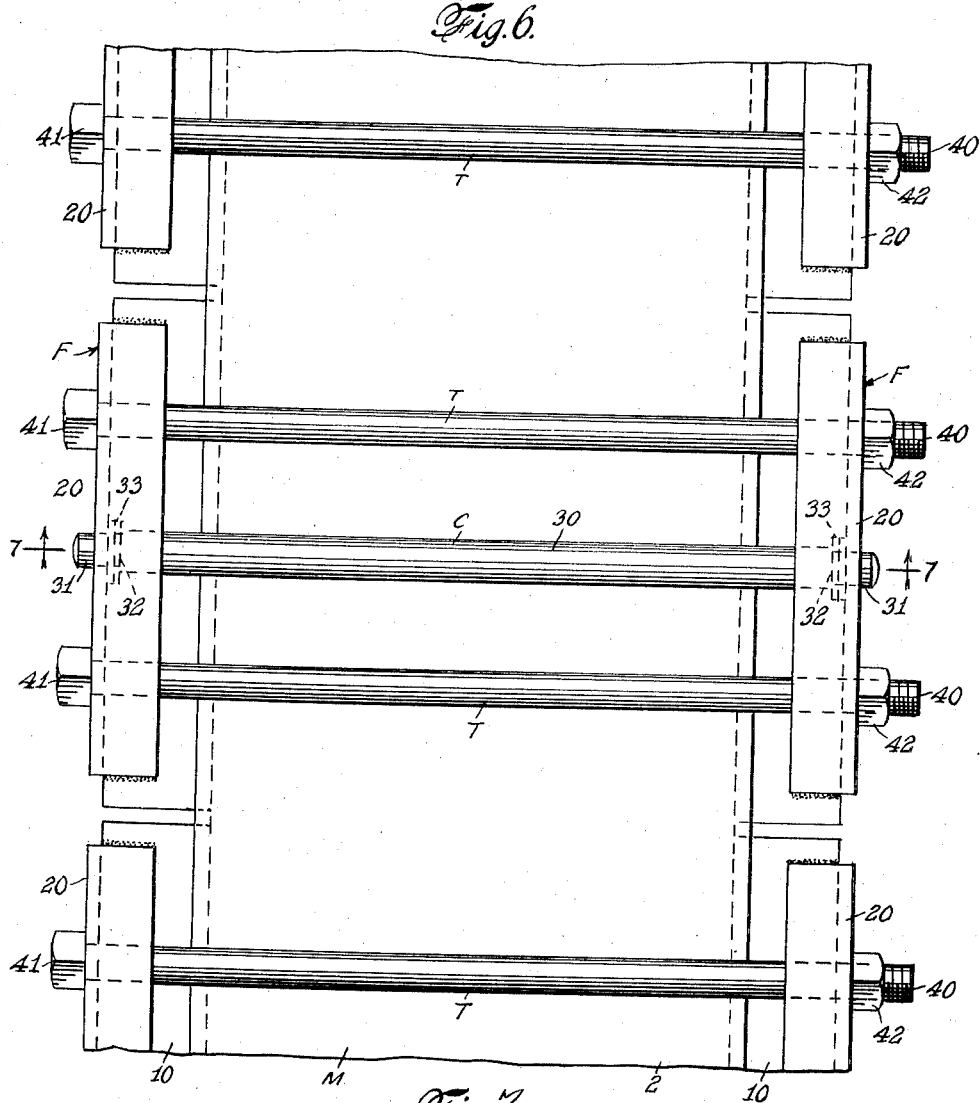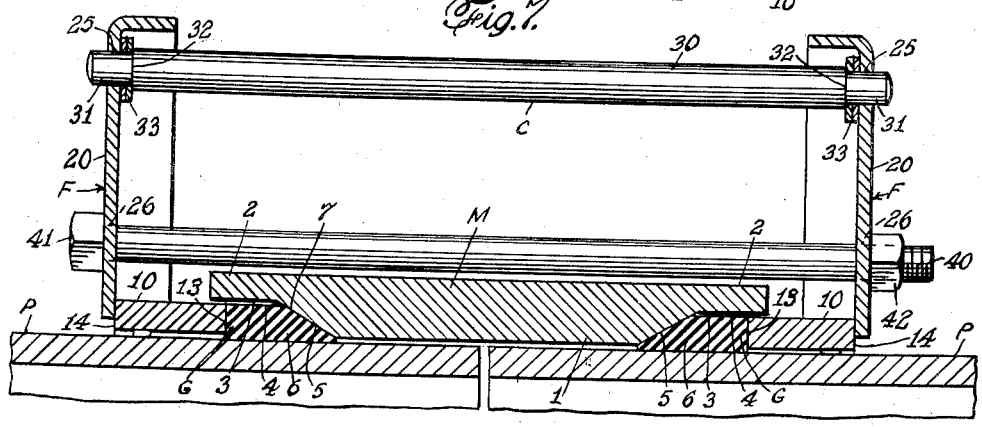

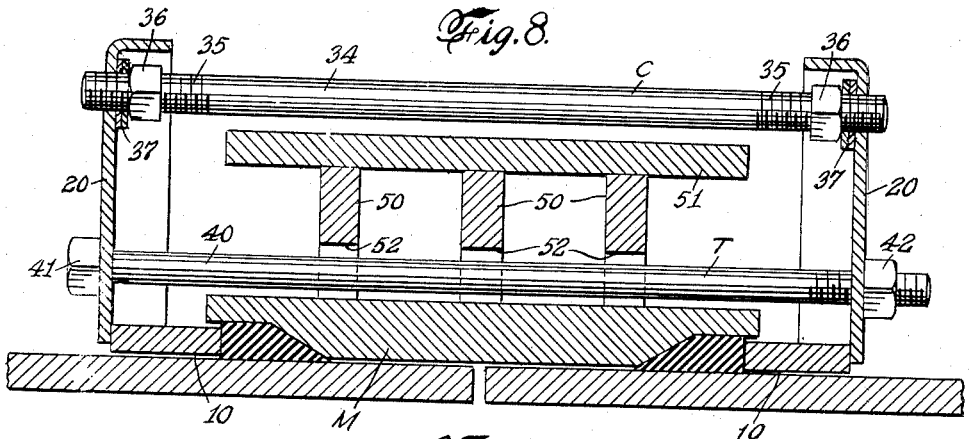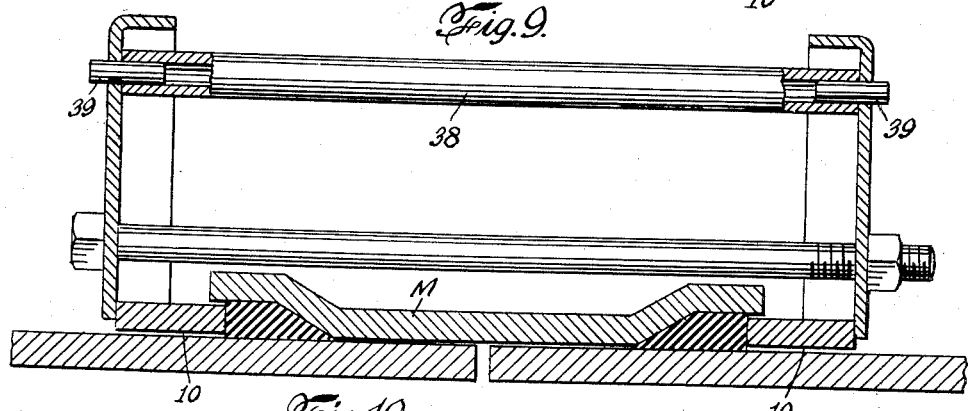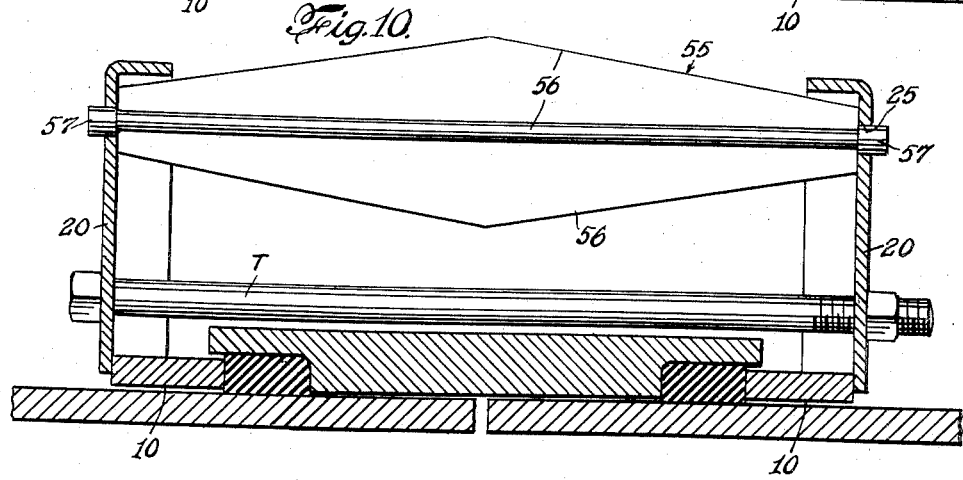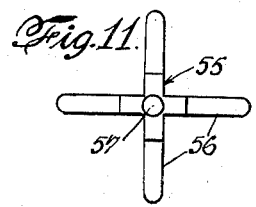

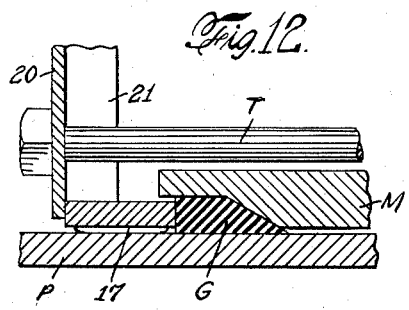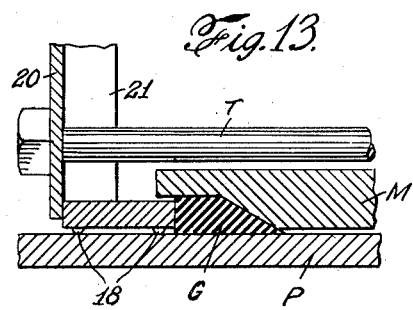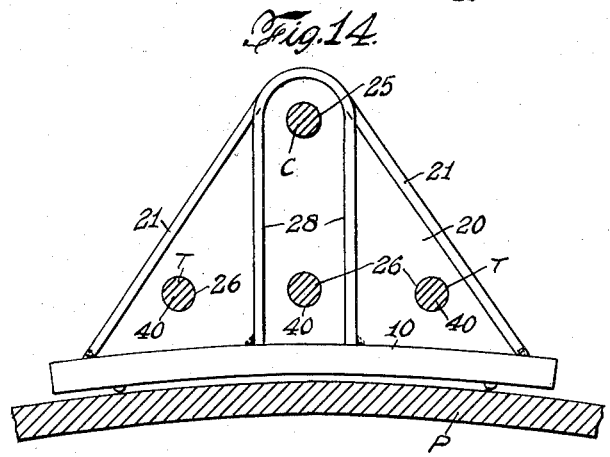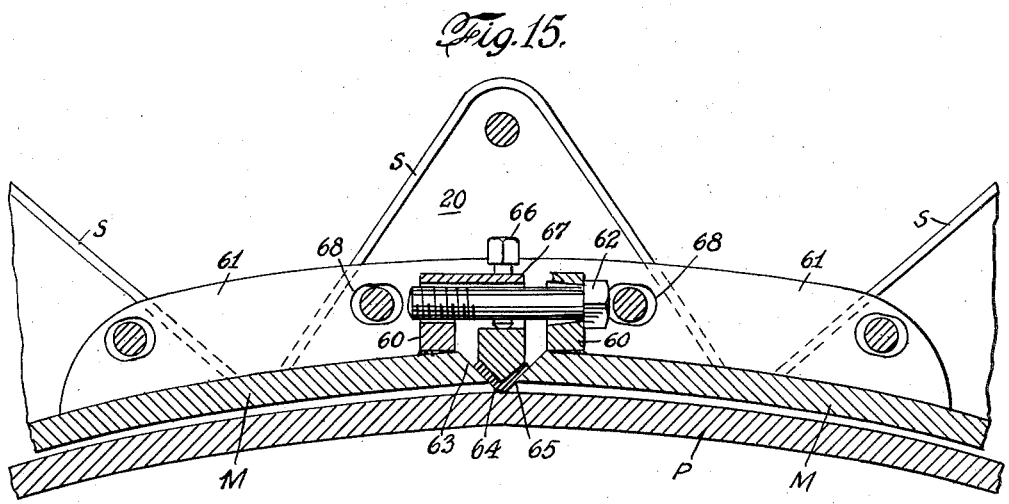

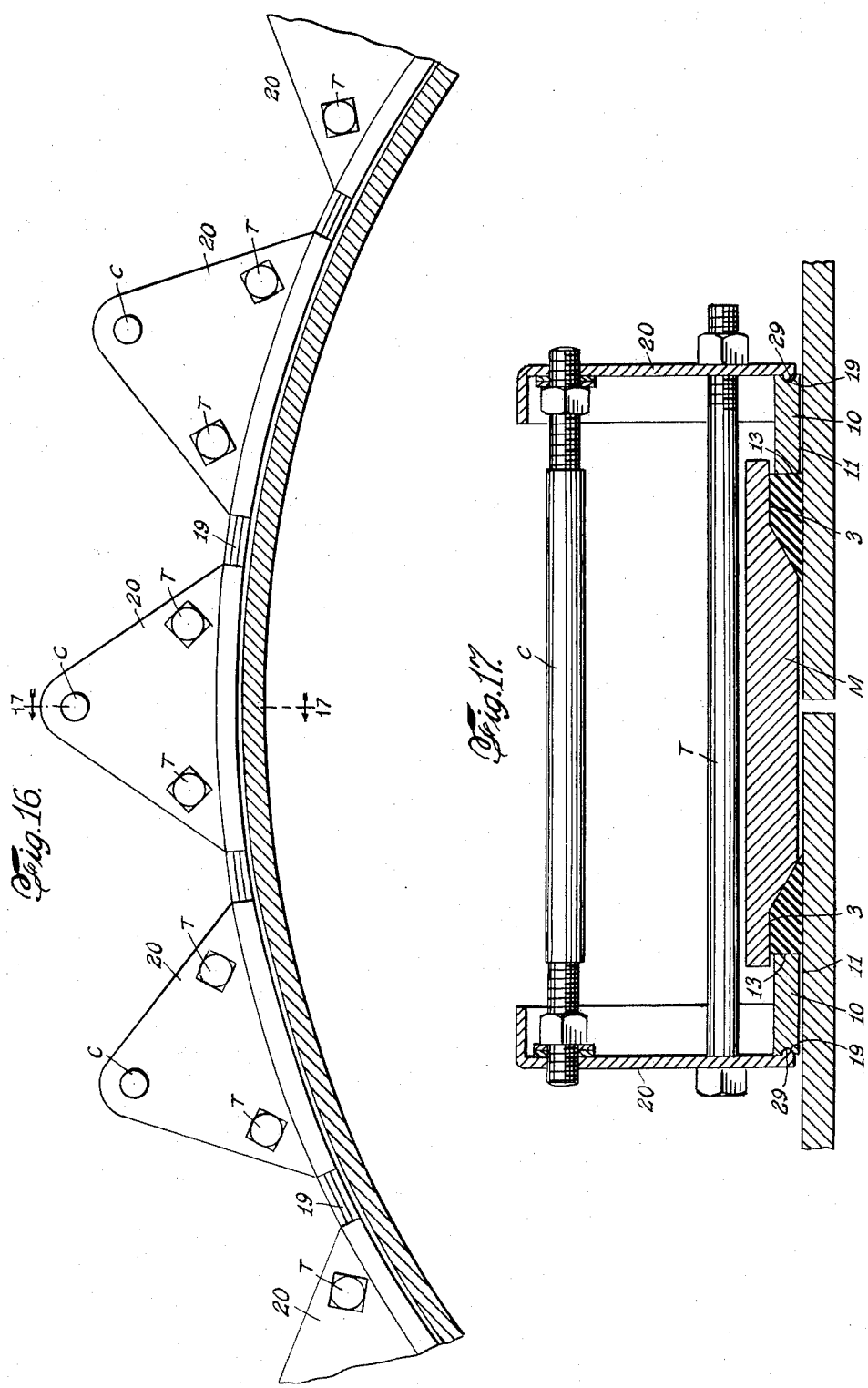

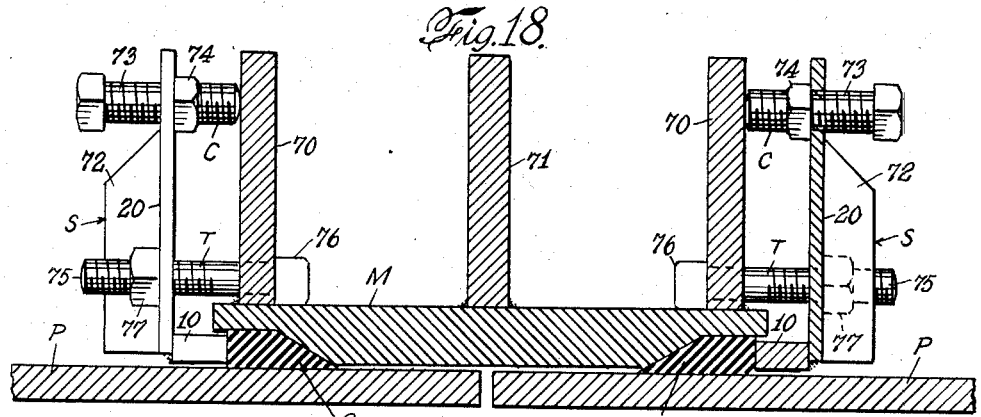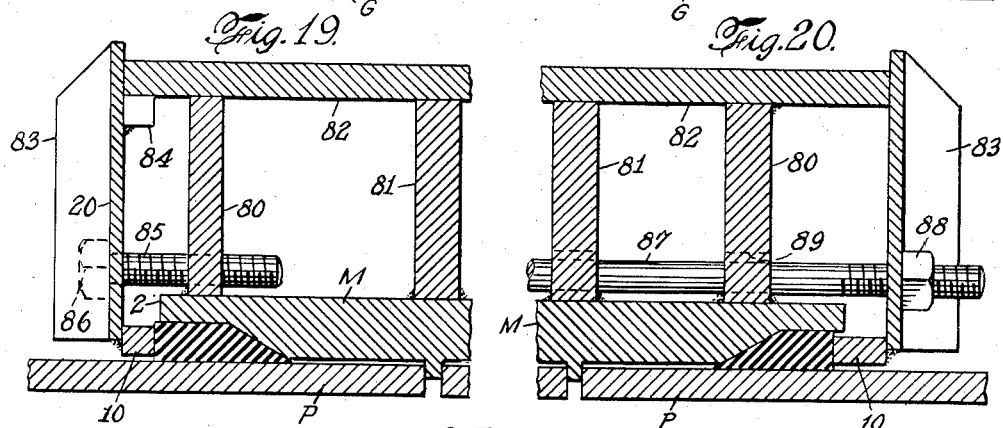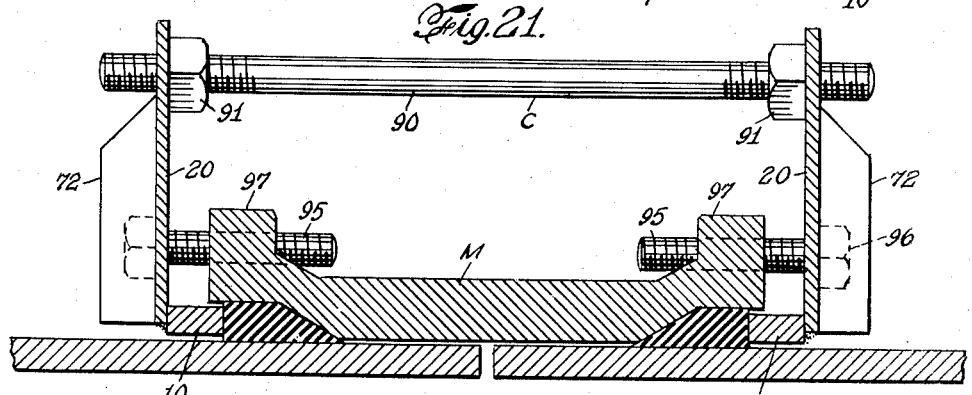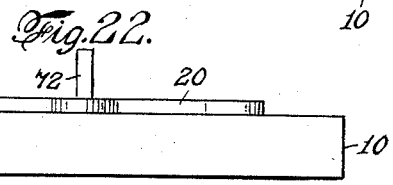

United States Patent Office 2,861,822
Patented Nov. 25, 1958

2,861,822

LARGE DIAMETER TYPE PIPE COUPLING WITH SEPARABLE PARKING FOLLOWER

Roger E. Risley and Robert N. Paterson, Bradford, Pa., assignors to Dresser Industries, Inc., Dallas, Tex., a corporation of Pennsylvania Application June 25, 1953, Serial No. 364,028

2 Claims. (Cl. 285—348)

The present invention relates to pipe couplings and particularly to couplings for large diameter pipe. The term "coupling" is herein used to include couplings, clamps and similar pipe fittings. The invention is especially applicable to couplings for plain end pipe comprising a middle ring, annular gaskets in recesses at the ends of the middle ring and follower rings for applying pressure to the gaskets, and will be described with reference to such couplings. However, it will be understood that the terms "middle ring," "follower," etc. are used for convenience and clarity of expression and are to be construed as including analogous structures.

In a pipe coupling of the kind employing an annular gasket and a follower ring for applying pressure to the gasket, the follower ring is subjected to torque resulting from the fact that the pull of the bolts or other tightening means and the resistance of the gasket are not in line with one another, the bolts being farther from the pipe than the gaskets. This torque tends to make the follower roll over when the bolts are tightened. In couplings for small diameter pipe, the curvature of the follower rings is such that rolling is not a serious problem since a curved section is more resistant to rolling. However, as the diameter of the coupling increases, the curvature of the follower ring becomes less until the portions between successive bolts are almost straight and the tendency to roll is aggravated.

A further problem arising in large diameter couplings, for example couplings of more than 30" diameter, is that of obtaining gasket pressure which is uniform around the entire circumference of the pipe. Variations in clearance between the pipe and the middle ring result in variations in the radial depth of the gasket recess and hence variations in gasket pressure. In small diameter couplings, the gasket tends to redistribute itself around the circumference of the pipe by flow of the gasket material to obtain approximately equal pressure. However, in large diameter couplings, the flow of gasket material is insufficient to compensate for variations in clearance between the middle ring and the pipe because of the greater circumferential distances involved. When the follower ring is drawn up, its movement is limited by the "high points," leaving intermediate points where gasket pressure is lower. For this reason, leaks may develop at points of inadequate gasket pressure. In order to repair a leak, it may be necessary to close down the line, back off the follower ring and shim up the gasket in the low pressure zones.

Large diameter couplings also present difficulties in shipping, handling and installing because of their size and weight. As the demand for large diameter couplings of any one size is relatively small, such couplings are usually made to special order for each job and are accordingly more expensive than stock couplings.

It is an object of the present invention to provide an improved pipe coupling that overcomes the foregoing difficulties and disadvantages. In accordance with the invention, the couplings, and in particular the followers, are made up of a plurality of relatively small sections that are manufactured and shipped separately and assembled when being installed on the pipe. The sections are made and assembled in such a way that rolling of the followers is positively prevented. When assembled on the pipe, the sections of the follower are individually adjustable so as to provide uniform gasket pressure all around the circumference. Moreover, if a leak should occur at one section, that section can be tightened to correct the leak without disturbing the other sections and without interrupting the service of the pipe line. Since the couplings are made up of relatively small pieces, they can be more easily manufactured, shipped, handled and installed. Moreover, the nature of certain parts is such that standard parts can be made up in large quantity and kept in stock, to be used as required in making up couplings of different sizes. The cost of production is thereby materially reduced.

Other objects and advantages of the invention will become apparent from the following description and claims in conjunction with the accompanying drawings, in which:

Fig. 1 is an end view of a coupling in accordance with the invention.

Fig. 2 is an enlargement of a portion of Fig. 1.

Fig. 3 is an end view on a still larger scale of one of the follower sections.

Fig. 4 is a top view of the follower section shown in Fig. 3.

Fig. 5 is a radial section taken approximately on the line 5—5 in Fig. 3.

Fig. 6 is a plan of one section of the coupling and portions of adjacent sections.

Fig. 7 is a longitudinal section taken approximately on the line 7—7 in Fig. 6.

Figs. 8, 9 and 10 are sections similar to Fig. 7 showing various modifications.

Fig. 11 is an end view of a compression member shown in Fig. 10.

Figs. 12 and 13 are fragmentary sectional views corresponding to the lower left hand portion of Fig. 7 but showing modifications.

Fig. 14 is an inside end view of a follower section in accordance with a modified construction.

Fig. 15 is a view similar to Fig. 14 but showing different forms of middle ring and follower section.

Fig. 16 is a partial end view of a further modification.

Fig. 17 is a longitudinal section taken approximately on the line 17—17 in Fig. 16.

Figs. 18 to 21 are longitudinal sections similar to Fig. 7 showing various modifications.

Fig. 22 is a top view of one of the follower sections shown in Fig. 18.

In Fig. 1 of the drawings, there is shown a coupling in accordance with the invention installed on a pipe P, details of construction being shown more fully in Figs. 2 to 7. As illustrated in the drawings, the coupling comprises a middle ring M having gasket recesses at its opposite ends, annular gaskets G in the gasket recesses, followers F for applying pressure to the gaskets, each of the followers being made up of a plurality of sections S, compression members C between the radially outer portions of the followers and tension members T connecting the followers at their radially inner portions.

The middle ring M comprises a ring or band of high tensile strength material, for example steel, and may be formed endless, split at one point in its circumference, or composed of a plurality of arcuate sections joined together end to end. A central or intermediate portion 1 of the middle ring has an internal diameter slightly larger than the outside diameter of the pipe so that the ends of pipe sections P will be received snugly in the middle ring. End portions 2 of the middle ring M are formed with a larger inside diameter so as to provide annular gasket recesses 3 between the end portions of the middle ring and the wall of the pipe. The gasket recesses are preferably of trapezoidal cross section, each having a substantially cylindrical portion 4 and a tapered portion 5.

The gasket G is formed of elastomer material, for example natural or synthetic rubber, and is sufficiently resilient and yielding to provide a fluid-tight seal when pressed into engagement with the middle ring and pipe by the follower, and yet sufficiently firm and tough to resist objectionable cold flow through the clearances normally provided between the surfaces that confine it. The gasket may be in the form of a continuous ring or it may be a split ring formed, for example, by a length of the gasket material wrapped around the pipe and having its ends abutting. The cross sectional shape of the gasket conforms approximately to that of the gasket recess. As illustrated in the drawings, the gasket is of trapezoidal cross section with a substantially rectangular portion 6 and a tapered or wedge-shaped portion 7. The thickness of the gasket in a radial direction is approximately equal to that of the gasket recess. However, the width of the gasket in an axial direction is less than the axial depth of the gasket recess, so that the gasket does not fill the recess. The end portion 2 of the middle ring thus projects in an axial direction beyond the gasket.

Pressure is applied to the gaskets to make a fluid-tight seal between the pipe and the middle ring by means of followers F disposed at opposite ends of the middle ring M. Each of the followers is made up of a plurality of identical sections S which are manufactured and shipped as individual units and are assembled when installing the coupling on the pipe. For large diameter pipes, the followers in accordance with the invention are composed of a relatively large number of sections, preferably at least six, and for larger pipe as many as twelve or more. In the coupling as shown by way of example in Fig. 1, each follower ring has twenty-four sections. The individual sections are hence relatively small even for very large diameter pipe. In fact, the same size sections may be used for very large pipe as well as for smaller pipe, the number of sections being varied in accordance with the circumference of the pipe.

One of the follower sections F is shown by way of example in Figs. 2 to 5 and comprises a follower bar portion 10 and a pressure-applying member 20 which, for convenience, is herein referred to as a pressure plate, although it may be of channel, bar or other form. The follower bar 10 is an arcuate bar having a radially inner face 11, a radially outer face 12, an axially inner face 13 and an axially outer face 14, and opposite ends 15. The curvature of the bar in a lengthwise direction corresponds approximately to the circumferential curvature of the pipe wall. The bar is shown as being of rectangular cross section with a thickness in a radial direction slightly less than the radial thickness or depth of the gasket recess 3 so that the follower bar can slide freely into the gasket recess and yet not leave spaces large enough to permit objectionable extrusion of the gasket material when pressure is applied. On the radially inner face 11 of the follower bar, there are preferably provided a plurality of small bumps 16 which are intended to space the follower bar slightly from the pipe for the purpose of being able to test gasket pressure, as will be explained below. The bumps provided on the inner face of the follower bar may be of different forms. For example, instead of the bumps 16 shown in Figs. 2, 3 and 7, there may be provided axially extending ribs 17, as shown in Fig. 12, or axially spaced bumps 18, as illustrated in Fig. 13.

The pressure plate 20 shown in Figs. 2 to 5 comprises an approximately triangular plate having peripheral flanges 21 on two of its sides. The flanges 21 preferably terminate slightly short of the third side of the triangular plate, which is referred to as its inner edge or base 22. The ends 23 of the flanges 21 are square, i. e. they lie in a plane substantially perpendicular to the body portion of the pressure plate. The depth of the flanges 21 in an axial direction is less than the axial width of the follower bar 10. The length of the inner edge or base 22 of the pressure plate is less than the length of the follower bar. The vertex 24 of the pressure plate 20 is preferably rounded (Figs. 2 and 3) and the flanges 21 are preferably integral with one another and have a curve portion extending around the vertex of the plate. The pressure plate may be formed in any appropriate manner, for example by stamping from flat plate stock. It is provided with a hole 25 near the vertex 24 of the triangular plate, and two holes 26 near the base of the plate and near the other two corners.

In assembling the pressure plate 20 and the follower bar 10, the pressure plate is placed on the bar so that the inner edge portion 22 of the plate overlies and engages the axially outer edge face 14 of the bar and the ends 23 of the flanges 21 engage the radially outer face 12 of the bar. The end portions of the bar project in a circumferential direction beyond the lower corners of the pressure plate. The axially inner edge portion of the bar projects beyond the flanges 21 in an axial direction. In couplings for larger sizes of pipes, the inner edge 22 of the pressure plate is straight and cuts across the arcuate face of the follower bar as a chord. The pressure plate hence need not be fitted to a particular size of pipe and the same pressure plates may be used with follower bars which vary in curvature and length, as indicated in broken lines 10' in Fig. 3. For use on smaller sizes of pipe, the inner edge of the pressure plate may be cut off, if necessary, so that it does not project beyond the radially inner face 11 of the follower bar 10.

As the follower bar 10 is received in the angle formed between the ends 23 of the flanges 21 and the pressure plate 20, the bar is automatically positioned with respect to the pressure plate. To secure the bar and plate in assembled relation, the ends 23 of the flanges 21 may be welded to the bar and, if desired, short welds 27 may be made between the bar and end portions of the inner edge 22 of the plate. However, as will be pointed out below, these welds are not under stress in the assembled coupling and may be omitted. In this event, the plate and bar are preferably provided with interengaging projections and recesses to assure that the pressure plate does not slip off the bar in a radially outward direction. An example of such construction is shown in Fig. 17 and described below. Interengaging portions may likewise be employed to position the plate relative to the follower bar in a circumferential direction.

In assembling the coupling on the pipe, the middle ring M is placed in position around the abutting pipe ends (or over a leak, if it is to be used as a repair clamp) and gaskets are placed in the gasket recesses 3. The followers are then assembled on the pipes in pairs, each pair comprising a section of one follower and an axially aligned section of the other follower. The two sections of a pair are placed on the pipe with the flange side of one pressure plate facing the flange side of the other. The radially inner faces 11 of the follower bars 10 are placed in contact with the outside of the pipe and the axially inner edge portions of the follower bars are slipped into the gasket recesses of the middle ring so that the axially inner faces 13 engage the gasket. The pressure plates are thus disposed approximately perpendicular to the pipe with their apices pointing radially outwardly. Between the apex portions of the opposite pressure plates of a pair, there is positioned a compression member C. In Figs. 6 and 7, the compression member is shown in the form of a rod 30 having reduced end portions 31 providing shoulders 32. The end portions 31 project into the holes 25 provided near the apices of the pressure plates and the pressure plates seat on the shoulder 32. One or more washers 33 are preferably interposed between the pressure plates and the shoulder. The pressure plates 20 of a pair are connected by tension members T shown in the form of bolts 40 having heads 41 and nuts 42. The bolts extend through the holes 26 near the base portions of the pressure plates and are hence nearer the pipe than the compression member C. They are preferably as close to the follower bar as is permitted by the middle ring and may even extend through portions of the middle ring, as described below. Tightening the bolts 40 draws the base portions of the pressure plates 20 toward one another, and thereby presses the follower bar portions 10 axially into the gasket recesses to apply pressure to the gaskets G.

Pairs of follower sections F are installed successively around the pipe until a full complement of sections is in place. The follower bar portions of successive sections are disposed end to end and may either be in actual contact or spaced slightly from one another, it being understood that a certain spacing is permissible without giving rise to objectionable cold-flow of the gasket material into the spaces. This permits adjustment of the circumferential length of the composite follower ring so that the follower can accommodate itself to over-sized or under-sized pipes. To facilitate positioning the follower sections around the pipe and to assure that they are equally distributed, suitable indices, such as notches or punch marks, may be provided on the end of the middle ring, as indicated at 45 in Fig. 2.

After all of the follower sections have been assembled loosely on the pipe, they are preferably tightened progressively. Since each section of a follower is independent of the other section, it can be tightened to exactly the right degree to provide the gasket pressure desired. This is ordinarily determined by the use of a suitable torque wrench. As a further test of gasket pressure, the point of a trowel or other thin instrument can be inserted between the follower bar and the pipe in the space provided by the small bumps 16, 17 or 18, in order to "feel" the gasket. If it feels hard, the gasket is known to be under sufficient pressure. If the gasket feels soft, or if it is possible to insert the point of the trowel between the gasket and the pipe, gasket pressure is inadequate.

Although the sections of a follower are not connected with one another, they are nevertheless held in position when installed on the pipe, as described above. The tension members T, in conjunction with the compression members C and the resistance of the gaskets G hold the follower sections in a stable position approximately perpendicular to the pipe. The forces acting on the pressure plates balance one another so that there is no tendency to roll. By having the tension members T located as close as possible to the follower bar 10 that engages the gasket, most of the pull of the tension members is applied to produce gasket pressure, only a small portion being taken by the compression members C. The lever arm between the tension members and the compression member is preferably at least twice that between the tension members and the follower bar. As will be seen from Fig. 7, the inner portions of the pressure plates bear directly on the axially outer faces 14 of the follower bars 10 so that the forces applied by the pressure plates are transmitted directly to the bars without relying on welds or other attaching means. As the follower bars are interlocked between the pipe and the end portions 2 of the middle ring M, movement of the follower bars in a radially outward direction is prevented.

The invention is susceptible of many applications and the structural form of the coupling may be modified as desired. A few such modifications are shown by way of example in Figs. 8 to 17. In these figures, the various parts are designated by the same reference characters as in Figs. 1 to 7.

As illustrated in Fig. 8, the middle ring M may be strengthened by one or more circumferentially extending radially projecting webs 50 encircling the middle ring, and if desired a circumferential band 51, the elements making up the middle ring being suitably welded or otherwise secured together. A middle ring of this construction is suitable for use on high pressure pipe lines. The tension members T pass through holes 52 in the webs 50 close to the inner portion of the middle ring and hence are close to the follower bars 10.

The compression member C is shown in Fig. 8 as a compression bolt 34 having threaded end portions 35 on which are screwed nuts 36. One or more washers 37 are preferably interposed between the nuts 36 and the inner faces of the pressure plates 20. By adjusting the nuts 36 in accordance with the tightening of the nuts 42 of bolts 40 that constitute the tension members T, it is possible to adjust the angular positions of the follower sections relative to the pipe. Moreover, by tightening the nuts 42 and then screwing the nuts 36 in a direction toward the pressure plates, additional gasket pressure can be obtained, it being thereby possible to take advantage of the relatively long lever arm between the tension members T and compression member C.

In Fig. 9, there is shown a further form of the compression member C comprising a piece of pipe or tubing 38 having pins 39 inserted in its ends.

In Figs. 10 and 11, the compression member C is shown in the form of a strut 55 which is X-shaped in cross section, with four mutually perpendicularly longitudinally-extending fins 56. The fins are tapered in a lengthwise direction, being wider at the middle and narrower near the ends. This provides maximum column strength with minimum weight of material. At the ends of the strut 55, there are longitudinally projecting portions 57 adapted to go into the holes 25 of the pressure plate 20. The strut members 55 can conveniently be formed as castings or can be fabricated from sheet material, for example by welding together two V-shaped sections.

The number of compression members and tension members between the pressure plates of a pair of follower sections may be varied in accordance with the size of the sections, the operating pressure of the pipe line, and other design factors. In Fig. 14, there is shown a pressure plate 20 having three holes 26 for tension members shown in the form of bolts 40. In addition to peripheral flanges 21 on its two outer sides, the pressure plate has two ribs 28 which straddle the hole 26 for the central tension member and also the hole 25 for a compression member C. The ribs 28 are preferably of the same depth and thickness as the flanges 21 and may be formed of a single strip of material bent to proper form and welded to the pressure plate and to the follower bar 10.

Fig. 15 illustrates by way of example a coupling in accordance with the invention employing a split or sectional middle ring with fluid-tight joints between the ends of the middle ring sections. Where the middle ring M is divided or split, it is provided with side bars 60 which are reinforced by one or more peripherally extending gussets 61. Circumferentially extending stud bolts 62 go through holes in one of the side bars 60 and screw into tapped holes in the other side bar to connect the ends of the middle ring sections. End portions of the middle ring project beyond the side bars 60 and are beveled as indicated at 63. A packing or gasket 64 is pressed against the beveled ends 63 of the middle ring sections by a follower 65 which has a V-shaped inner surface and is pressed radially inwardly by means of a plurality of set screws 66 which are screwed through tapped holes in an overhanging portion 67 of one of the side bars 60.

After the middle ring sections M have been connected by the bolts 62 and drawn up snugly, although not necessarily tightly, on the pipe, the set screws 66 are progressively tightened to force the V-shaped follower 65 radially inwardly, and thereby press the gasket 64 against the beveled ends 63 of the middle ring sections M, to form a fluid-tight joint. It will be understood that the gasket 64 and follower 65 extend transversely of the middle ring from one annular gasket G to the other. The gussets 61 are provided with suitably positioned holes 68 to accommodate the tension members T of the follower sections S.

Instead of being welded to the follower bar portions 10, as described above, the pressure plates 20 may be separate members not permanently connected to the follower bar. In this event, the follower bar may be made as an endless or split ring or may be divided into two, three or more sections, with a plurality of pressure plates applied to each section. Such a construction is illustrated by way of example in Figs. 16 and 17, where the follower bar 10 is shown as being continuous. While the pull of the tension members T on the pressure plates 20 is transmitted to the follower bars 10 by the engagement of the base portions of the pressure plates directly on the follower bars without depending on any connecting means, it is desirable to provide some means for positioning the pressure plates with respect to the follower bars to prevent any possibility of the pressure plates slipping radially outwardly. As such positioning means is not normally subjected to any substantial stress, it can be of a very simple nature. As illustrated in Figs. 16 and 17, the pressure plates 20 are provided on their inner faces near the radially inner edges of the plates with projecting portions 29 which fit into suitable recesses or grooves 19 provided in the axially outer faces of the follower bars 10. The projecting portions 29 may be in the form of continuous ribs or can be separate projections or bumps. Likewise, the depressions 19 in the follower bars may be continuous grooves or spaced recesses. In the latter case, the interengaging projections and recesses may serve to position the pressure plates in a circumferential direction around the follower rings as well as to prevent them from slipping off the ring in a radially outward direction.

As illustrated in Figs. 18 to 21, portions of the middle ring structure may be used as tension and compression means between the follower sections. In the embodiment illustrated in Fig. 18, the middle ring M is provided with circumferentially extending radially projecting webs 70 and 71 which may either be continuous rings or arcuate gussets like the gussets 61 of Fig. 15. Each of the follower sections S comprises a follower bar section 10 and a pressure plate 20 reinforced by a central rib 72, the pressure plates being preferably of triangular shape. Stud bolts 73 extend through holes near the apices of the pressure plates 20 and through nuts 74 which are preferably welded on the inner faces of said pressure plates in alignment with said holes. The inner ends of the stud bolts 73 bear on the webs 70 of the middle ring M. Tension bolts 75, having heads 76 and nuts 77, extend through aligned holes in the pressure plates 20 and radially inner portions of the webs 70. Preferably, two or more tension bolts 75 are provided for each pressure plate. By tightening the nuts on the tension bolts 75, the pressure plate, and hence the follower bar section 10, can be drawn inwardly toward the middle ring to apply pressure to the gasket G. The torque resulting from the fact that the pull of the bolts 75 is not in line with the resistance of the gasket is counteracted by the compression bolts 73. By the coordinated action of the bolts 73 and 75, the pressure plate 20 can be positioned in the desired radial relation to the pipe, for example perpendicular.

In the embodiment of Fig. 19, the middle ring M is provided with circumferentially extending radially projecting webs 80 and 81 and an encircling circumferential band 82. The pressure plates 20 are similar to those of Fig. 18 except that they need have no holes in their apex portions and central ribs 83 preferably extend to the apices of the pressure plates, as shown. The apex portions of the pressure plates bear on the opposite edges of the encircling band 82 of the middle ring M which thus constitutes a compression member between the opposite follower sections. The pressure plates are preferably provided on their inner faces with abutments 84 which are adapted to engage the inner face of the encircling band 82 so as to position the pressure plates and hold them against radially outward movement. It is hence unnecessary for the follower bar sections 10 to hook under the end edges 2 of the middle ring to hold the follower sections against outward movement. Tension bolts 85 having heads 86 extend through holes in the pressure plates and screw into tapped holes in the radially inner portions of the circumferentially extending webs 80. Preferably, at least two such bolts are provided for each pressure plate.

The embodiment of Fig. 20 is similar to that of Fig. 19 except that the short tension bolts 85 are replaced by longer tension bolts 87 which extend all the way through from one pressure plate to the opposite pressure plate, being provided with heads at one end and nuts 88 at the other. Holes 89 are provided in the webs 80 and 81 of the middle ring M to accommodate the bolts 87. It will be understood that each of Figs. 19 and 20 shows slightly more than half of the middle ring, the web 81 being central.

In the embodiment of Fig. 21, the pressure plates are substantially the same as in Fig. 18 and are designated by the same reference numerals. The compression members C between the apex portions of the pressure plates are shown as bolts 90 having nuts 91, but it will be understood that other compression members, as shown, for example, in Figs. 7, 9 and 10, may be used. Tension bolts 95 having heads 96 extend through holes in the radially inner portions of the pressure plates and are screwed into tapped holes in radially projecting portions 97 of the middle ring M. The projections 97 may be in the form of spaced lugs or continuous flanges.

It will be understood that the individual features of the various embodiments which have been described and shown in the drawings by way of example are mutually interchangeable where their character permits. While the drawings show a coupling having two followers at opposite ends of a middle ring, it will be understood that, in some instances, a single follower may be used, e. g. on a bell joint, suitable anchoring means being provided for the tension and compression members. It will be further understood that still other modification may be made and that the invention is in no way limited to the embodiments shown by way of example in the drawings.

What we claim and desire to secure by Letters Patent is:

1. In a coupling for large-diameter plain end pipe, a continuous middle ring for receiving the end portions of two pipe sections to be coupled, opposite end portions of the middle ring defining annular gasket recesses open to the ring ends and to the inner surface of the ring, annular gaskets in said recesses, followers for applying pressure to said gaskets, said followers consisting of a plurality of like follower bar portions having approximately the same curvature as the ring and adapted to enter said gasket recesses so that the axially inner faces of the follower bar portions engage the gaskets, and a plurality of like separate triangular pressure plates disposed approximately perpendicular to the ring and having their base portions bearing on the axially outer faces of said follower bar portions and the apices of the triangles pointing radially outwardly, whereby each follower when viewed in a section including the axis of the ring and follower is L-shaped with the follower bar portion defining an inner arm portion entering said gasket recess and the pressure plate defining a radial portion spaced from the end face of the adjacent ring end, said followers being free from bearing contact with said middle ring and the radial portions of said followers being provided with radially-spaced apertures, tension members extending through aligned radially inner apertures in the followers at opposite ends of said ring, and nuts on said tension members, the tightening of said nuts on said tension members drawing the opposite followers toward one another to apply pressure to the gaskets, and compression members extending between said followers and engaging in the radially outer apertures in the radial portions, said tension members and said compression members being free from engagement with said middle ring, said tension members being spaced circumferentially from said compression members and the sum of the tension members and the compression members being at least three for each pressure plate, said tension members and said compression members being disposed symmetrically in each pressure plate with respect to a plane midway between the ends of the plate and including the axis of the ring, said tension members being disposed radially inwardly from the compression members and extending between opposite pressure plates close to the middle ring and when pressure is applied to the gaskets in said gasket recesses the radially outer portions of said radial portions are held apart by said compression members.

2. In a coupling for large-diameter plain end pipe, a continuous middle ring for receiving the end portions of two pipe sections to be coupled, opposite end portions of the middle ring defining annular gasket recesses open to the ring ends and to the inner surface of the ring, annular gaskets in said recesses, followers for applying pressure to said gaskets, each of said followers comprising a plurality of like sections each of which, viewed in a section including the axis of the ring and follower, is L-shaped and comprises an inner arm portion entering said gasket recess to apply pressure to the gasket, and a radial portion spaced from the end face of the adjacent ring end, said follower sections being free from bearing contact with said middle ring and each radial portion being provided with two circumferentially spaced-apart radially inner apertures and a radially outer aperture, tension members extending through aligned radially inner apertures in the follower sections at opposite ends of said ring, and nuts on said tension members, the tightening of said nuts on said tension members drawing the opposite followers toward one another to apply pressure to the gaskets, and compression members extending between said follower sections and engaging in the radially outer apertures in the radial portions, said tension members and said compression members being free from engagement with said middle ring, said tension members being spaced circumferentially from said compression members and the sum of the tension members and the compression members extending through the follower sections being three for each section, said tension members and said compression members being disposed symmetrically in each section with respect to a plane midway between the ends of the section and including the axis of the ring, said tension members being disposed radially inwardly from the compression members and extending between opposite follower sections close to the middle ring and when pressure is applied to the gaskets in said gasket recesses the radially outer portions of said radial portions are held apart by said compression members.

References Cited in the file of this patent

UNITED STATES PATENTS

| 471,436 | Robinson | Mar. 22, 1892 |
| 1,196,785 | Johnson | Sept. 5, 1916 |
| 1,417,492 | Brandt | May 20, 1922 |
| 1,479,650 | Clark | Jan. 1, 1924 |
| 1,926,422 | Armbruster | Sept. 12, 1933 |
| 2,009,744 | Pfefferle | July 30, 1935 |
| 2,087,752 | Carson | July 20, 1937 |
| 2,701,730 | Risley | Feb. 8, 1955 |

FOREIGN PATENTS

| 12,838 | Austria | Aug. 10, 1903 |
| 290,661 | Great Britain | Jan. 24, 1929 |
| 655,866 | Great Britain | Aug. 1, 1951 |